United States Patent
Asakawa

(10) Patent No.: US 9,185,563 B2
(45) Date of Patent: Nov. 10, 2015

(54) UNAUTHORIZED USE PREVENTING SYSTEM OF PROJECTION-TYPE PROJECTOR

(71) Applicant: Mitsubishi Electric Corporation, Tokyo (JP)

(72) Inventor: Katsumi Asakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/089,413

(22) Filed: Nov. 25, 2013

(65) Prior Publication Data

US 2014/0201818 A1    Jul. 17, 2014

(30) Foreign Application Priority Data

Jan. 17, 2013   (JP) ................................ 2013-006081

(51) Int. Cl.
    *G06F 21/88*      (2013.01)
    *H04W 12/08*      (2009.01)
    *H04N 9/31*      (2006.01)

(52) U.S. Cl.
CPC .............. *H04W 12/08* (2013.01); *G06F 21/88* (2013.01); *H04N 9/3194* (2013.01); *G06F 2221/2111* (2013.01); *G06F 2221/2137* (2013.01)

(58) Field of Classification Search
CPC . G06F 21/88; G06F 21/81; G06F 2221/2111; G06F 21/00
See application file for complete search history.

(56) References Cited

U.S. PATENT DOCUMENTS

| | | | |
|---|---|---|---|
| 6,166,688 A * | 12/2000 | Cromer et al. | 342/357.74 |
| 8,044,880 B2 | 10/2011 | Nakamura et al. | |
| 2007/0030835 A1 | 2/2007 | Kurata | |
| 2010/0169949 A1 * | 7/2010 | Rothman et al. | 726/1 |
| 2012/0007841 A1 | 1/2012 | Nakamura et al. | |
| 2012/0169760 A1 * | 7/2012 | Mochizuki | 345/618 |

FOREIGN PATENT DOCUMENTS

| | | |
|---|---|---|
| JP | 2007-225831 A | 9/2007 |
| JP | 2008-233831 A | 10/2008 |
| JP | 4826130 B2 | 11/2011 |
| TW | M388017 | 1/2007 |
| WO | WO 2010/113256 A1 | 10/2010 |

* cited by examiner

*Primary Examiner* — Izunna Okeke
(74) *Attorney, Agent, or Firm* — Birch, Stewart, Kolasch & Birch, LLP

(57) ABSTRACT

An unauthorized use preventing device includes: a first measuring unit that measures a global position thereof and outputs the global position as first position information; and a first transmission unit that wirelessly transmits the first position information to an outside. The security section includes: a second measuring unit that measures a global position thereof and outputs the global position as second position information; a first receiving unit that receives the first position information; a position comparison unit that determines whether an inter-instrument distance calculated based on the first and second position information is less than a threshold distance or equal to or more than the threshold distance, and outputs a result of the determination as a position comparison result signal; and a logical product calculation unit that calculates and outputs a logical product of the position comparison result signal and a power supply turning-on signal.

11 Claims, 9 Drawing Sheets

F I G. 4
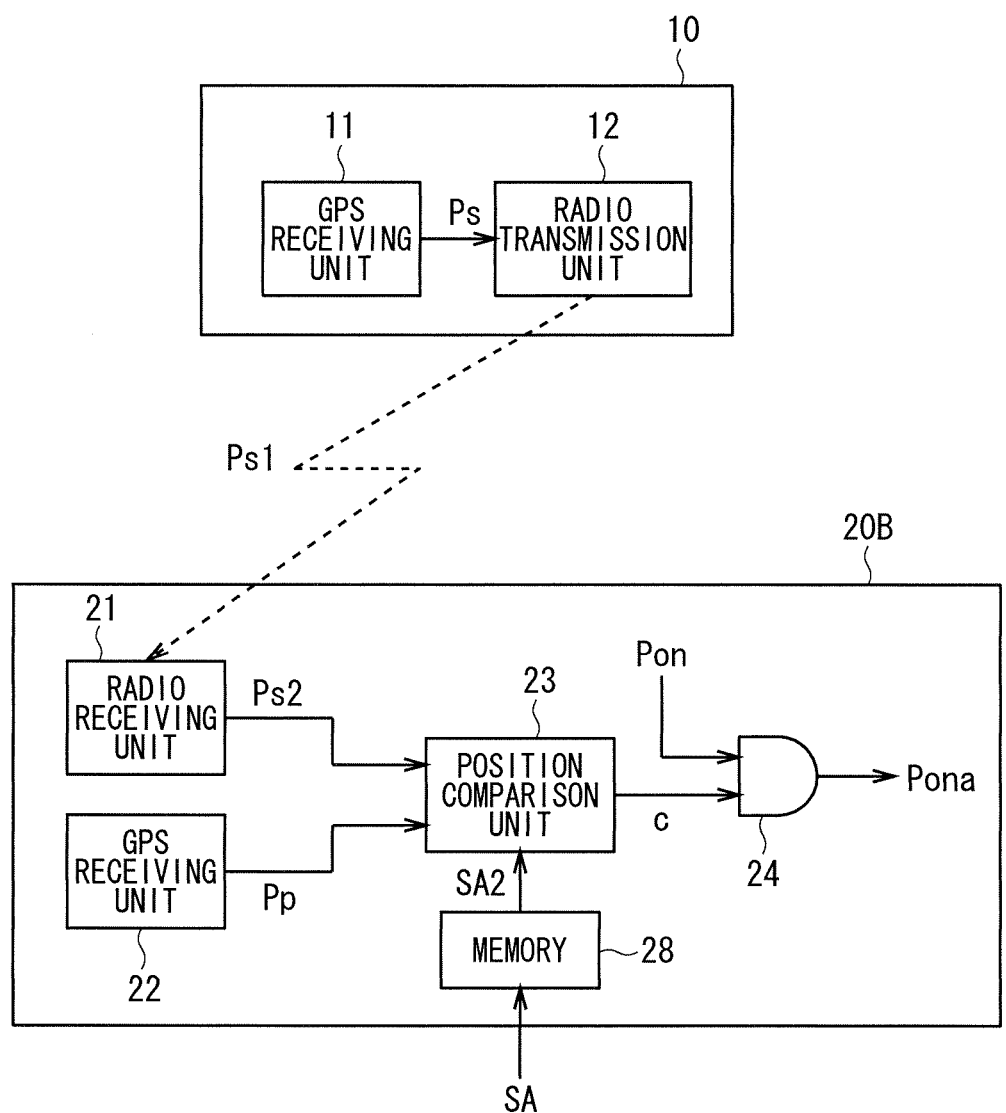

F I G. 5
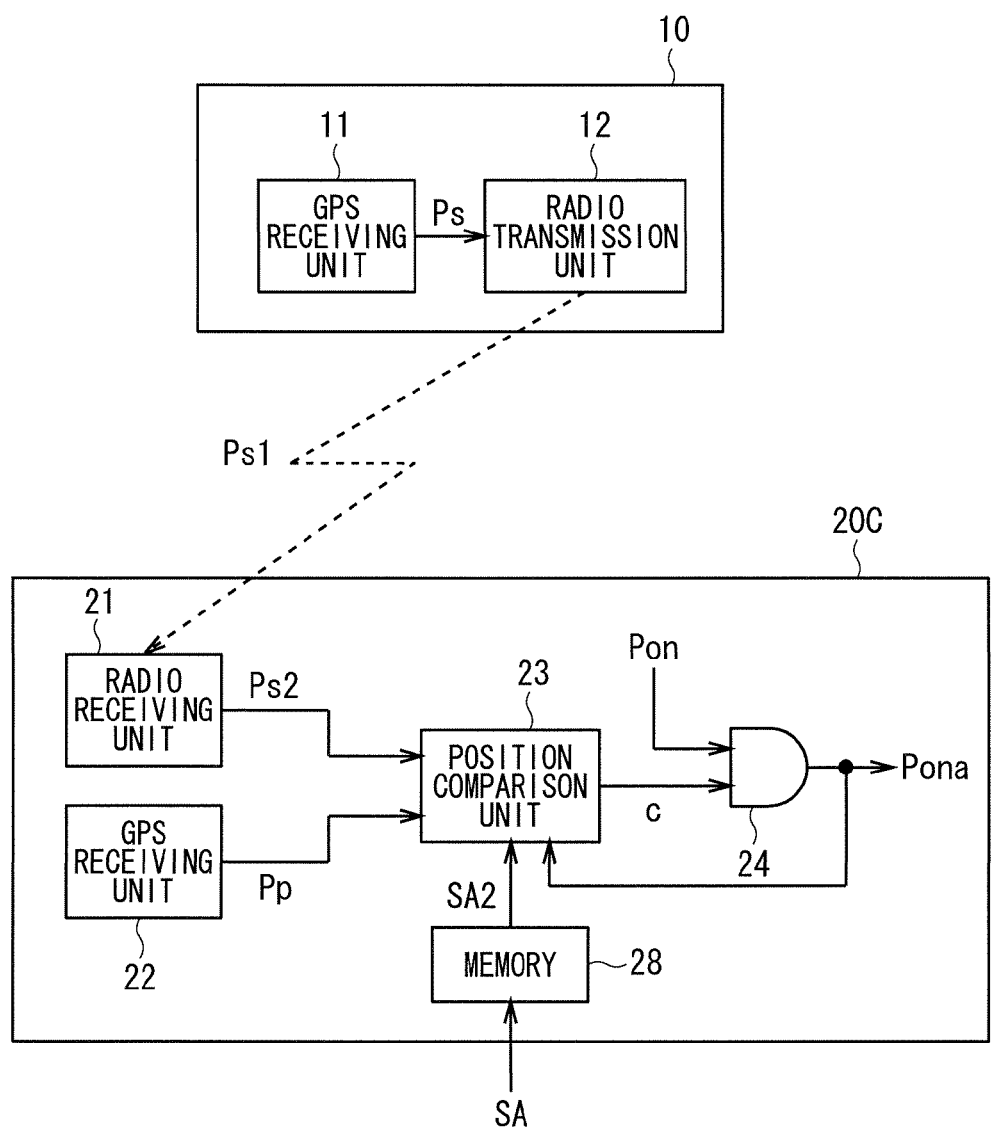

UNAUTHORIZED USE PREVENTING SYSTEM OF PROJECTION-TYPE PROJECTOR

BACKGROUND OF THE INVENTION

1. Field of the Invention

The present invention relates to a projection-type projector, and particularly, relates to an unauthorized use preventing system of a projection-type projector, which prevents unauthorized use of the projection-type projector.

2. Description of the Background Art

As an instrument for use in presentation, a projection-type projector is communally used in a frequent manner at a place where many people gather, such as a conference room, a field of education, which includes a school or the like, and a training facility. At such a place, and particularly, in a wide room, it takes time to move the projection-type projector from a storage place thereof and fix the projection-type projector to a dedicated fixing device provided on a ceiling or a wall every time when the projection-type projector is used, and accordingly, in general, it is frequent that the projection-type projector is used while being left fixed to the ceiling or the wall.

Meanwhile, it is frequent that a small and lightweight projection-type projector is shared by a plurality of persons in such manners that the projection-type projector is taken to a business trip destination, is carried to a plurality of conference rooms, and so on. In such use, it is rare that the projection-type projector is fixed to the ceiling or the wall, and it is general that the projection-type projector is used while being mounted on a desk or a base.

In any of the cases described above, it is highly possible that the projection-type projector, which is relatively expensive, may be stolen during a period while being left. Therefore, measures for preventing unauthorized use of the projection-type projector or preventing theft thereof, which include restriction of use, the restriction being implemented by setting a password, have been adopted. However, convenience for users has been lost since the password must be inputted every time when the projection-type projector is used, for example, every time when a power supply thereof is turned on.

For this problem, for example, a projection-type video display device of Japanese Patent No. 4826130 (Patent Literature 1) detects a usage thereof at the time when a power supply thereof is turned on, and compares the detected usage with a usage thereof at the last time, and thus prevents the convenience from being lost by requiring input of a password only at the time when the usage is changed.

In the projection-type video display device of Patent Literature 1, as such usages, there are mentioned: an installation orientation of the device; an installation direction of the device; an installation place of the device; an input state to an input terminal of the device; a fixation state of the device; and a focus/zoom setting state of lenses. Then, at the time of having detected that one or a plurality of these usages are changed, the projection-type video display device determines that there is a possibility that the projection-type video display device may be unauthorizedly used, and requires the input of the password. Then, when the password does not coincide with one stored in the projection-type video display device, the projection-type video display device restricts the use thereof, or emits an alarm sound.

Moreover, a display device of Japanese Patent Application Laid-Open No. 2008-233831 (Patent Literature 2) includes a GPS receiver and a memory that stores a position detected by the GPS receiver. Then, this display device compares a current position thereof, which is measured by the GPS receiver, with a position thereof, at which the display device is used at the last time, stored in the memory, determines that there is a possibility that the display device may be unauthorizedly used if the two positions are spaced apart from each other at a fixed distance or more, and requires the input of the password. Then, in the case where the password does not coincide with one stored in the display device, the display devices restricts the use thereof, or emits an alarm sound.

However, even if such a theft preventing device according to Patent Literature 1 is provided, in the small and lightweight projection-type projector, which is frequently used after being moved, the input of the password is required every time when the projection-type projector is moved, and accordingly, improvement of the convenience is limited. Moreover, when input characters, numbers and the like of the password are reduced in order to suppress a decrease of the convenience, there has been a problem that the password is known to another person after the projection-type projector is stolen.

Moreover, in Patent Literature 1, it is mentioned that, in the projection-type video display device, the input of the password can be replaced by pushing of a release button of a remote controller (remote control) provided with a function to send out a signal for releasing the unauthorized use preventing system. The remote control as described above is stored in a place different from that of the projection-type video display device, the remote control is taken out only in the event of using the projection-type video display device, and the password is released by pushing the release button of the remote control, and if so, then it becomes possible to save the need for inputting the password; however, it becomes essential to carry the remote control upon turn-on for which the input of the password is required.

Moreover, in a body of the projection-type video display device (projection-type projector), operation buttons are usually provided, and the projection-type video display device is configured to be operable without the remote control; however, there has been a problem that it becomes necessary to input the password at an operation time by the operation buttons. Moreover, such a problem is not solved that, once the password is known to another person, the projection-type video display device is used without any difficulty thereon and thereafter.

In a similar way, even if the theft preventing device according to Patent Literature 2 is provided, there has been a problem that, once the password is known to another person, the display device is used without any difficulty thereon and thereafter.

SUMMARY OF THE INVENTION

It is an object of the present invention to provide an unauthorized use preventing system of a projection-type projector, which eliminates the necessity of the input of the password, and thus does not allow the convenience for users to be lost, and in addition, can prevent the unauthorized use thereof.

An unauthorized use preventing system of a projection-type projector according to the present invention includes: an unauthorized use preventing device disposed separately from the projection-type projector; and a security section provided in the projection-type projector, wherein the unauthorized use preventing device includes: a first measuring unit that measures a global position thereof and outputs the global position as first position information; and a first transmission unit that wirelessly transmits the first position information to an outside, the security section includes: a second measuring unit that measures a global position thereof and outputs the global position as second position information; a first receiving unit that receives the first position information; a position comparison unit that receives the first position information and the second position information, determines whether an inter-instrument distance calculated based on both pieces of the information is less than a threshold distance or equal to or more than the threshold distance, and outputs a result of the determination as a position comparison result signal; and a logical product calculation unit that receives the position comparison result signal and a power supply turning-on signal indicating whether or not a power supply of the projection-type projector is turned on, and calculates and outputs a logical product of both of the signals, and it is decided whether or not to light a light source of the projection-type projector based on an output signal of the logical product calculation unit, so that unauthorized use of the projection-type projector is prevented.

In accordance with the above description, it is unnecessary to impart, to the projection-type projector, such a function to require the input of the password every time when the power supply thereof is turned on for the purpose of the theft prevention. Accordingly, the convenience for users is not lost, and moreover, there is no drawback that the projection-type projector is unauthorizedly used when the password is known to another person, and therefore, the unauthorized use thereof can be prevented more surely.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing a main configuration of an unauthorized use preventing system of a projection-type projector of a third preferred embodiment according to the present invention;

FIG. 5 is a block diagram showing a main configuration of an unauthorized use preventing system of a projection-type projector of a fourth preferred embodiment according to the present invention;

DESCRIPTION OF THE PREFERRED EMBODIMENTS

Regarding Projection-Type Projector

In a projection-type projector, which receives a video signal from an instrument that outputs a video signal, the instrument including a personal computer, a video instrument such as a DVD recorder, and the like, and then projects a video concerned to a screen, the following two types are mentioned as typical configurations thereof.

One is a configuration, in which light from a light source such as a lamp is passed through a display device such as a transmission-type liquid crystal panel that forms a video pattern based on a video signal, whereby a projection video is created, or alternatively, a projection video is created by using a reflection-type liquid crystal panel that reflects light corresponding to a video pattern.

As an example of this, such a configuration as below is mentioned. Specifically, three reflection-type liquid crystal panels are used, video patterns corresponding to red light, green light and blue light, which are three primary colors of light, are formed on the respective liquid crystal panels, and red light, green light and blue light, which correspond to the respective liquid crystal panels, are inputted thereto, whereby videos of the three primary colors are obtained. Then, the videos of the three primary colors are synthesized with one another by using an optical component such as a mirror, and the synthesized videos are outputted as a color video from a projection optical system.

Another is a configuration, in which the light from the light source such as the lamp is reflected by a reflection-type display device that forms the video patterns corresponding to red, green and blue in a time division manner, whereby a projection video is created.

As an example of this, such a configuration as below is mentioned. Specifically, the video patterns corresponding to red, green and blue are formed in a time division manner by a display device called a DMD (registered trademark) in which a plurality of movable micro mirror surfaces (micro mirrors) corresponding to one pixel are arrayed on a plane, and the light from the light source is made incident and reflected through color filters which create the red light, the green light and the blue light in accordance with the video patterns of the respective colors, whereby videos of the three primary colors are obtained in a time division manner. Then, the videos are sequentially outputted through the projection optical system, whereby one color video is obtained by a temporal integration effect. Note that the DMD is an abbreviation of Digital Micromirror Device.

An unauthorized use preventing system of a projection-type projector according to the present invention is applicable to either of the above-described two types of the projection-type projectors. A description is made below of preferred embodiments of the unauthorized use preventing system of a projection-type projector according to the present invention.

Figure 1:
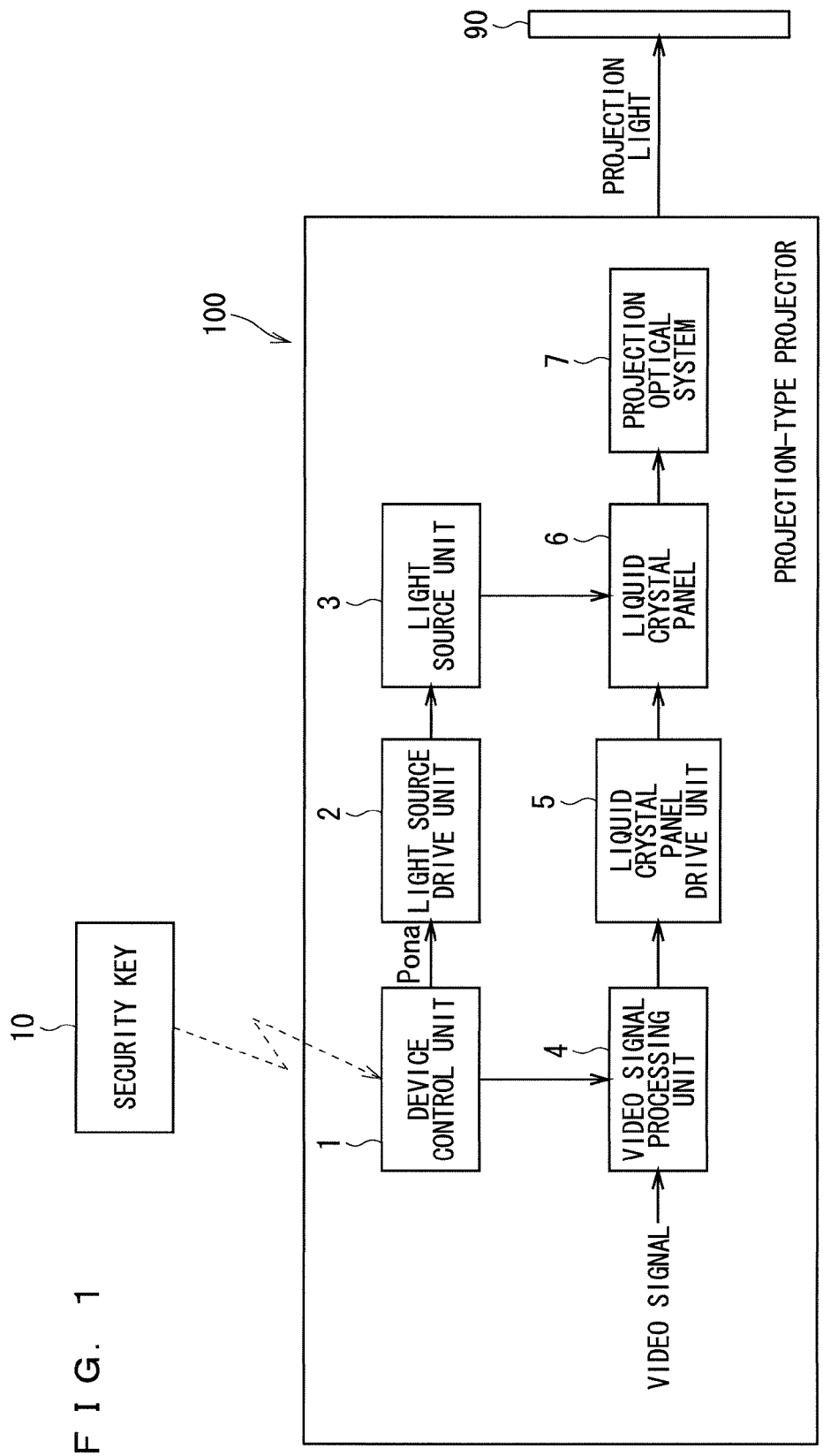
FIG. 1 is a block diagram showing a schematic configuration of a whole of a projection-type projector to which the present invention is applied.

FIG. 1 is a block diagram showing a schematic configuration of a whole of a projection-type projector 100 to which the present invention is applied, and a security key 10 (unauthorized use preventing device) essential to prevent unauthorized use of the projection-type projector 100. An unauthorized use preventing system of a projection-type projector is composed of the projection-type projector 100 and the security key 10.

As shown in FIG. 1, the projection-type projector 100 has a configuration for creating a projection video by using a liquid crystal panel, and as main components, includes a device control unit 1, a light source drive unit 2, a light source unit 3, a video signal processing unit 4, a liquid crystal panel drive unit 5, a liquid crystal panel 6, and a projection optical system 7. By projection light emitted from the projection optical system 7, an image is projected onto a screen 90 installed on an outside of the projection-type projector 100.

For example, the device control unit 1 is a region, which is composed of a microprocessor such as a CPU (Central Processing Unit), and controls the respective units in the projection-type projector 100. The light source drive unit 2 performs control for a lamp for a light source in the light source unit 3.

The video signal processing unit 4 is a region, which receives a video signal from a personal computer and a video instrument such as a DVD recorder, and converts the received video signal into a signal for reproducing an image therefrom on the liquid crystal panel 6.

Based on the video signal coming from the video signal processing unit 4, the liquid crystal panel drive unit 5 creates a signal for driving the respective pixels of the liquid crystal panel 6, outputs the created signal to the liquid crystal panel 6, and thus displays a video pattern on the liquid crystal panel 6.

The projection optical system 7 is a region that projects, onto the outside, the video pattern displayed on the liquid crystal panel 6, and is composed of optical components including a projection lens for forming an image of emitted light of the liquid crystal panel 6 onto the screen 90, and the like.

Note that, in the projection-type projector, on a body thereof, and on a remote controller (remote control) for operating the projection-type projector, power supply buttons for turning a power supply of the projection-type projector ON (turning on the light source and projecting a video) and OFF (turning off the light source and erasing the video) are provided as general components.

A region related to security in the device control unit 1 of the projection-type projector 100 is a region according to the present invention. A description is made below of preferred embodiments according to the present invention.

First Preferred Embodiment

Figure 2:
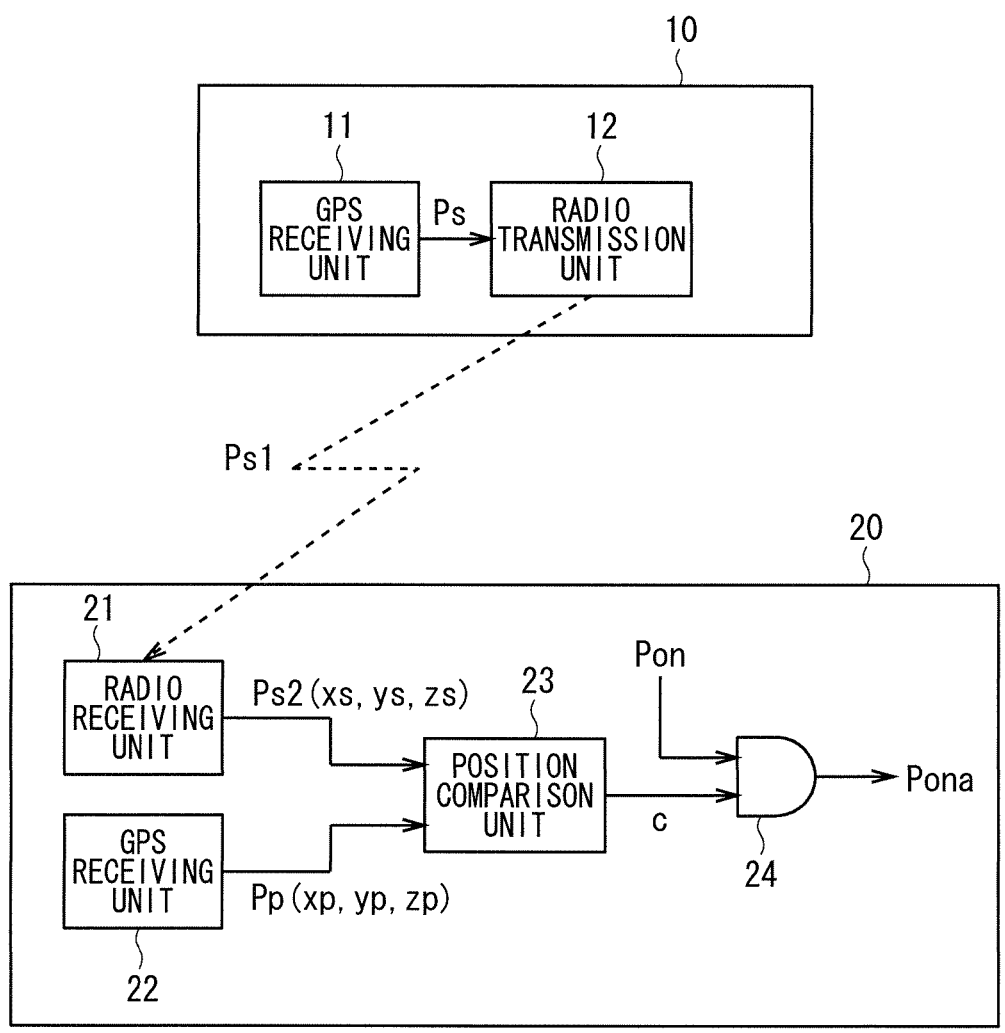
FIG. 2 is a block diagram showing a main configuration of an unauthorized use preventing system of a projection-type projector of a first preferred embodiment according to the present invention.

FIG. 2 is a block diagram showing a main configuration of an unauthorized use preventing system of a projection-type projector of a first preferred embodiment according to the present invention, and shows configurations of a security section 20 of the projection-type projector 100 and the security key 10. Note that the security section 20 is a region related to security, which is included in the device control unit 1 shown in FIG. 1.

As shown in FIG. 2, the security key 10 includes a GPS (Global Positioning System) receiving unit 11 (first measuring means) and a radio transmission unit 12, and the security section 20 includes a radio receiving unit 21, a GPS receiving unit 22, a position comparison unit 23 and an AND gate 24.

The GPS receiving unit 11 of the security key 10 is a region that measures a global position (latitude, longitude and altitude) of the security key 10, and by using position signals of a plurality of GPS satellites, which are received from the respective GPS satellites, and the respective pieces of distance information from the respective GPS satellites to the GPS receiving unit 11, acquires a current position of the GPS receiving unit 11 itself, that is, the security key 10.

Then, the GPS receiving unit 11 gives global position information Ps of the security key 10 to the radio transmission unit 12, and the radio transmission unit 12 modulates the position information Ps into a radio signal Ps1 by a carrier frequency, and periodically transmits the radio signal Ps1 to an outside of the security key 10.

Upon receiving the radio signal Ps1, the radio receiving unit 21 of the security section 20 demodulates the radio signal Ps1 into position information Ps2, and outputs the position information Ps2 to the position comparison unit 23. Note that the position information Ps2 becomes a signal indicating the same position as that in the position information Ps.

The GPS receiving unit 22 (second measuring means) of the security section 20 is a region that measures a global position (latitude, longitude and altitude) of the projection-type projector 100, and outputs global position information Pp of the projection-type projector 100 to the position comparison unit 23.

At present, output signals of the GPS have some formats including the NMEA-0183 format standardized by the National Marine Electronics Association, which substantially serves as a reference. Here, for the sake of simplification, the description is made on the assumption that the global position information (longitude x, latitude y, altitude z) obtained from GPS receivers are outputted from the GPS receiving unit 11 and the GPS receiving unit 22.

The position comparison unit 23 receives the global position information Ps2 (xs, ys, zs) of the security key 10 and the global position information Pp (xp, yp, zp) of the projection-type projector 100, and calculates an inter-instrument distance d between the security key 10 and the projection-type projector 100 by the following equation (1).

$$d=\{(xs-xp)^2+(ys-yp)^2+(zs-zp)^2\}^{0.5} \quad (1)$$

where xs, ys and zs indicate the longitude, the latitude and the altitude, which are of the global position of the security key 10, respectively, and xp, yp and zp indicate the longitude, the latitude and the altitude, which are of the global position of the projection-type projector 100, respectively.

Then, in the case where the inter-instrument distance d between the security key 10 and the projection-type projector 100 satisfies the following equation (2) as a result of comparison in the position comparison unit 23, the projection-type projector 100 is regarded not to be unauthorizedly used, the power supply of the projection-type projector 100 is permitted to be turned ON, and the light source is lighted.

$$d<a \quad (2)$$

where a is a threshold value. If the inter-instrument distance d between the security key 10 and the projection-type projector 100 does not satisfy the equation (2), that is, is equal to or more than the threshold distance a, then the projection-type projector is regarded to be unauthorizedly used, the power supply of the projection-type projector 100 is not permitted to be turned ON, and the light source is not lighted.

More specifically, if it is determined that d is smaller than a (d<a) by the position comparison unit 23, then a value of an output c (position comparison result signal) of the position comparison unit 23 is set at 1, and if it is determined that d is equal to or larger than a (d a), then the value of the output c of the position comparison unit 23 is set at 0. Then, in the AND gate 24, a logical product output Pona of the position comparison result signal c and a signal Pon (1 at the time when the power supply is ON, and 0 otherwise) coming from a power supply ON button of the projection-type projector 100 or the remote control is acquired.

Pona becomes 1 only at the time when the distance between the security key 10 and the projection-type projector 100 is less than a, and when the power supply ON button is pushed. Accordingly, control is performed so that the light source of the projection-type projector 100 can be lighted only in the case where this logical product output Pona is 1. That is to say, the logical product output Pona outputted from the security section 20 is given, to the light source drive unit 2, as a light source control signal coming from the device control unit 1 shown in FIG. 1, and based on the light source control signal concerned, the light source drive unit 2 controls the light source unit 3 to be lighted or not lighted.

As described above, unless the security key 10 is put in the vicinity (at a distance less than a) of the projection-type projector 100, then the light source of the projection-type projector 100 is not lighted. Accordingly, the projection-type projector 100 cannot be used even if only the projection-type projector 100 is carried out, and it becomes possible to prevent such unauthorized use of the projection-type projector 100 that the projection-type projector 100 is stolen and used.

The security key 10 is a small electronic instrument, which uses a battery as a power supply, and includes a GPS receiving function, a radio communication function, a small-capacity memory and a display portion. The security key 10 is stored in a place where radio communication thereof with the projection-type projector 100 is not prohibited, and the security key 10 is less likely to be discovered with ease, for example, in a room next to a room where the projection-type projector 100 is installed, or alternatively, in a locked shelf even in the room where the projection-type projector 100 is installed (however, where the security key 10 is radio-communicable with the projection-type projector 100). In such a way, the security key 10 is prevented from being carried out together with the projection-type projector 100.

In accordance with the projection-type projector of the first preferred embodiment described above, if only the small security key 10 is stored as appropriate, then the unauthorized use of the projection-type projector 100 can be prevented, and moreover, it is not necessary to impart, to the projection-type projector 100, such a function to require the input of the password every time when the power supply thereof is turned on for the purpose of the theft prevention. Accordingly, the convenience for users is not lost. Furthermore, the projection-type projector 100 does not have the drawback of being unauthorizedly used if the password is known to another person, either, and accordingly, the unauthorized use thereof can be prevented more surely.

The security key 10 just needs to be put in the vicinity (at the distance less than a) of the projection-type projector 100, and it is not necessary to carry the security key 10 concerned, and accordingly, it becomes possible to operate the projection-type projector 100 while storing the security key 10.

Modification Example

In the first preferred embodiment described above, an example is illustrated, where the global position information of the security key 10 and the global position information of the projection-type projector 100 are acquired by using the GPS receiving unit 11 and the GPS receiving unit 22, respectively. However, there may be used such a measuring technology for estimating a position of a terminal based on information regarding a receiver of an indoor measuring system, which is called IMES (Indoor MEssaging System) and is configured to obtain position information by using a compatible signal of the GPS signal even in an inside of a building and an underground shopping arcade, and including a MAC address and radio field intensity of a WiFi access point.

Moreover, in the first preferred embodiment, an example is illustrated, where the GPS receiving unit 11 and the GPS receiving unit 22, each of which measures the latitude, the longitude and the altitude, are used. However, if the use of the projection-type projector in the same building, which includes use thereof on different floors of the building, is unconditionally permitted, then a GPS receiving unit that measures only the latitude and the longitude may be used.

Second Preferred Embodiment

Figure 3:
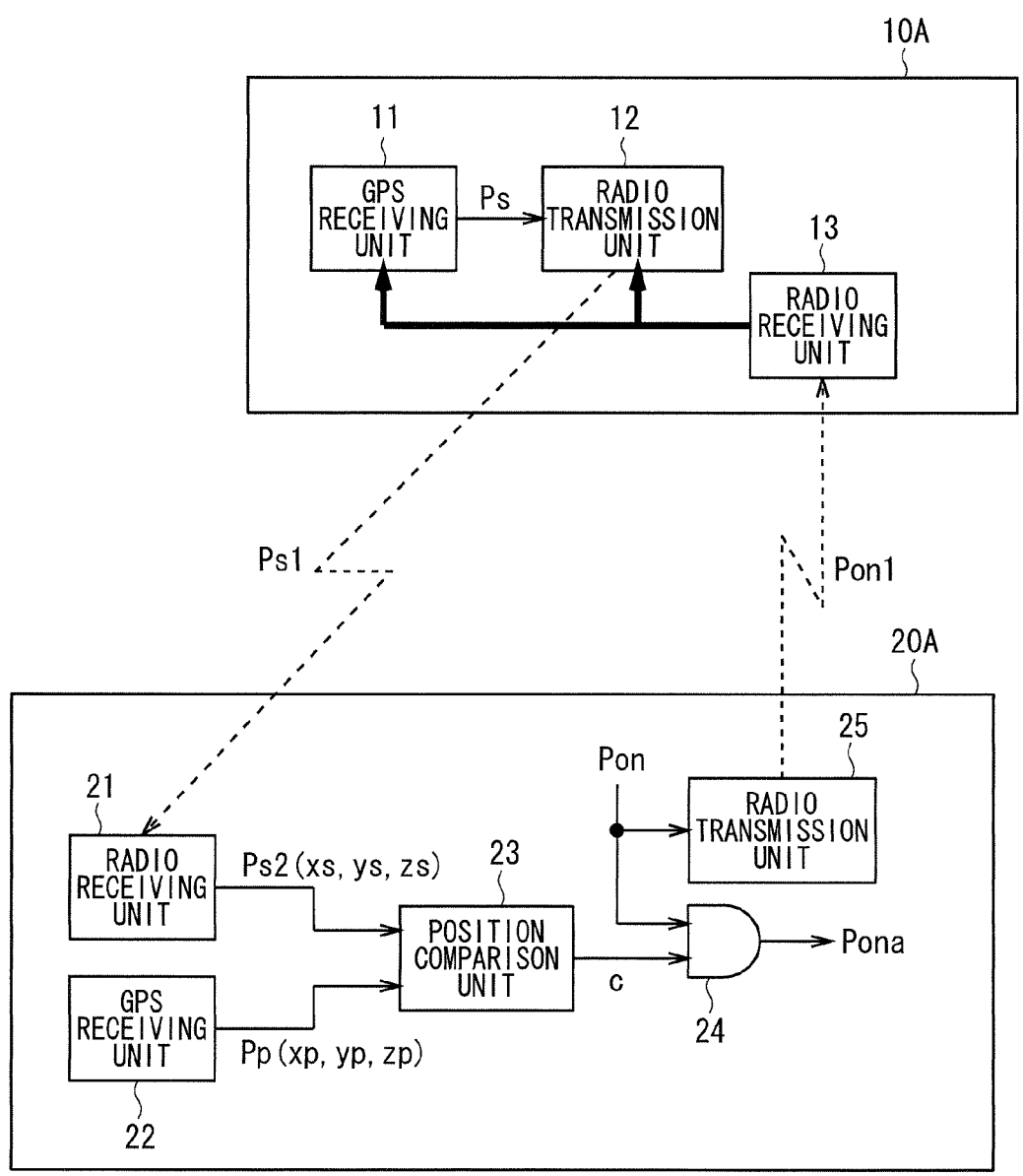
FIG. 3 is a block diagram showing a main configuration of an unauthorized use preventing system of a projection-type projector of a second preferred embodiment according to the present invention.

FIG. 3 is a block diagram showing a main configuration of an unauthorized use preventing system of a projection-type projector of a second preferred embodiment according to the present invention, and shows configurations of a security section 20A of the projection-type projector 100 and a security key 10A (unauthorized use preventing system). Note that the security section 20A is a region related to the security, which is included in the device control unit 1 shown in FIG. 1.

As shown in FIG. 3, the security key 10A is configured to further include a radio receiving unit 13, which is connected to the GPS receiving unit 11 and the radio transmission unit 12, with respect to the security key 10 of the first preferred embodiment, which is shown in FIG. 2. The security section 20A is configured to further include a radio transmission unit 25, which is connected to an input of the AND gate 24, with respect to the security section 20 of the first preferred embodiment, which is shown in FIG. 2.

That is to say, while the configuration in which the signal Ps1 indicating the global position of the security key 10 is periodically transmitted from the radio transmission unit 12 is adopted in the first preferred embodiment, it is preferable that power consumption of the small security key 10 be set low if long-term use thereof is assumed since it is desired that the security key 10 be driven by a battery. Therefore, in the second preferred embodiment, there is adopted a configuration in which the security key 10A is driven only at the time when the power supply of the projection-type projector 100 is turned on.

That is to say, the signal Pon (1 at the time when the power supply is ON, and 0 otherwise) coming from the power supply ON button of the projection-type projector 100 or the remote control is given to the AND gate 24, and in addition, also to the radio transmission unit 25.

The radio transmission unit 25 modulates the signal Pon into a radio signal Pon1 by the carrier frequency, and transmits the radio signal Pon1 to the outside of the projection-type projector 100. The radio receiving unit 13 in the security key 10A receives and demodulates the radio signal Pon1, and operates the GPS receiving unit 11 and the radio transmission unit 12 for a fixed period t only in the case where the signal Pon is 1.

That is to say, the signal Pon coming from the power supply ON button of the projection-type projector 100 or the remote control is transmitted as the radio signal Pon1 trough the radio transmission unit 25 to the outside, the radio receiving unit 13 of the security key 10A, which receives the signal Pon, demodulates the radio signal Pon1 into the signal Pon, and outputs a control signal for activating the GPS receiving unit 11 and the radio transmission unit 12 only in the case where the signal Pon is 1.

During this fixed period t, the GPS receiving unit 11 outputs the global position information Ps of the security key 10A to the radio transmission unit 12, the radio transmission unit 12 modulates the global position information Ps into the radio signal Ps1 by the carrier frequency, and transmits the radio signal Ps1 to an outside of the security key 10A. After the fixed period t elapses, the radio receiving unit 13 stops the operations of the GPS receiving unit 11 and the radio transmission unit 12.

During the fixed period t, the projection-type projector 100 receives the signal Ps1, which indicates the global position of the security key 10A, from the radio transmission unit 12. Operations on and after this reception of the signal Ps1 are the same as those of the first preferred embodiment.

In accordance with the projection-type projector of the second preferred embodiment described above, the GPS receiving unit 11 and the radio transmission unit 12 in the security key 10A are operated only at the time when the power supply of the projection-type projector 100 is turned on. Power consumption of the GPS receiving unit 11 and the radio transmission unit 12 becomes large in the case where drive thereof by a battery is assumed, and accordingly, the period while these are operated is restricted, whereby it becomes possible to reduce the power consumption of the security key 10A, and it becomes possible to drive the security key 10A for a long time.

Modification Example

In the second preferred embodiment described above, such a configuration in which the security key 10A is operated only at the time when the power supply of the projection-type projector 100 is turned on is adopted; however, the second preferred embodiment is not limited to this, and a configuration in which the security key 10A is periodically operated even while the power supply is being turned on may be adopted, and the security key 10A may be allowed to sense whether or not the projection-type projector 100 is unauthorizedly used. In particular, this modification example is effective in such a case where a state where the power supply is turned on is maintained for a long time as in use of digital signage.

Third Preferred Embodiment

FIG. 4 is a block diagram showing a main configuration of an unauthorized use preventing system of a projection-type projector of a third preferred embodiment according to the present invention, and shows configurations of a security section 20B of the projection-type projector 100 and the security key 10. Note that the security section 20B is a region related to the security, which is included in the device control unit 1 shown in FIG. 1.

As shown in FIG. 4, the security section 20B is configured to further include a memory 28, which is connected to the position comparison unit 23, with respect to the security section 20 of the first preferred embodiment, which is shown in FIG. 2.

In the first preferred embodiment, such a configuration is adopted, in which the projection-type projector 100 is regarded not to be unauthorizedly used if the equation (2) is satisfied (the inter-instrument distance d between the security key 10 and the projection-type projector 100 is less than the threshold distance a), and the projection-type projector 100 is regarded to be unauthorizedly used in the case where the equation (2) is not satisfied (the inter-instrument distance d between the security key 10 and the projection-type projector 100 is equal to or more than the threshold distance a). In the security section 20B of the third preferred embodiment, there is adopted a configuration in which a criterion as to whether or not the projection-type projector is unauthorizedly used is changed by varying a value of the threshold distance a.

For example, on the projection video, such use-permitted ranges as "OFF, 10 m, 20 m, 30 m . . . " are displayed as a menu screen, and the user is allowed to select the threshold distance a by which it is determined whether or not the projection-type projector is unauthorizedly used.

Here, "OFF" stands for that the user is not allowed to determine whether or not the projection-type projector is unauthorizedly used, namely, the functions of the present invention are not operated. When any one is selected from the use-permitted ranges displayed on the menu screen, a use-permitted range setting signal SA corresponding to the selected use-permitted range is inputted to the memory 28. Note that the use-permitted range setting signal SA is created in the device control unit 1 (FIG. 1) in an interlocking manner with the selection on the menu screen.

The use-permitted range setting signal SA is not the signal that directly indicates the threshold distance a, and accordingly, is temporarily given to the memory 28, and is converted into a value SA2 (value corresponding to the threshold distance a) of the use-permitted range corresponding to the use-permitted range setting signal SA stored in the memory 28.

For example, in the memory 28, SA2=amax, 10, 20, 30 . . . are stored in advance so as to correspond to SA=0, 1, 2, 3 . . . , respectively.

Here, "amax" is defined to be a maximum value (for example, 255 in the case of 8 bits) expressible by the threshold distance a in the equations (1) and (2). Moreover, a maximum value dmax expressible by the inter-instrument distance d is defined to be a value (for example, 254 in the case of 8 bits) smaller than the maximum value amax expressible by a. As a result, dmax<amax is established, and accordingly, this becomes equivalent to that the functions of the present invention are turned OFF.

The position comparison unit 23 receives the value SA2 (value corresponding to the threshold distance a) of the use-permitted range, and compares the value SA2 with the inter-instrument distance d between the security key 10 and the projection-type projector 100. Operations on and after this comparison are the same as those of the first preferred embodiment.

In accordance with the projection-type projector of the third preferred embodiment described above, for example, the use-permitted range is set as appropriate, whereby it becomes possible to strictly control the unauthorized use of the projection-type projector in such a manner that the projection-type projector is prohibited from being carried out to an adjacent room without permission. Moreover, on the contrary, it also becomes possible to set the use-permitted range so that the projection-type projector can be used in a plurality of the adjacent rooms.

Modification Example

In the third preferred embodiment described above, there is illustrated such a configuration in which the use-permitted range is inputted on the menu screen of the projection video; however, there may be adopted such a configuration in which the use-permitted range is directly inputted from the operation buttons of the projection-type projector 100 or the operation buttons of the remote control, or alternatively, there may be adopted a method, in which selection buttons for the use-permitted range are provided on the security key 10, and the selected use-permitted range is transmitted to the projection-type projector 100, whereby the use-permitted range is switched.

Fourth Preferred Embodiment

FIG. 5 is a block diagram showing a main configuration of an unauthorized use preventing system of a projection-type projector of a fourth preferred embodiment according to the present invention, and shows configurations of a security section 20C of the projection-type projector 100 and the security key 10. Note that the security section 20C is a region related to the security, which is included in the device control unit 1 shown in FIG. 1.

As shown in FIG. 5, with respect to the security section 20B of the third preferred embodiment, which is shown in FIG. 4, the security section 20C is configured so that feedback of the output Pona of the AND gate 24 can be given to the position comparison unit 23.

As mentioned above, in the projection-type projector 100, the light source is lighted only in the case where the logical product output Pona outputted by the position comparison unit 23 is 1. Accordingly, the projection-type projector 100 is configured so that the switching of the use-permitted range in the position comparison unit 23 can be allowed only in the case where the output Pona is given to the position comparison unit 23 and the output Pona is 1.

For example, during a standby operation of the projection-type projector 100, the switching of the use-permitted range in the position comparison unit 23 is not allowed.

In accordance with the projection-type projector of the fourth preferred embodiment described above, it becomes possible to prevent an unauthorized user to switch OFF the use-permitted range (that is, to prevent the operation of the functions of the present invention from being shut off) in the case where the light source of the projection-type projector 100 is not lighted.

Fifth Preferred Embodiment

Figure 6:
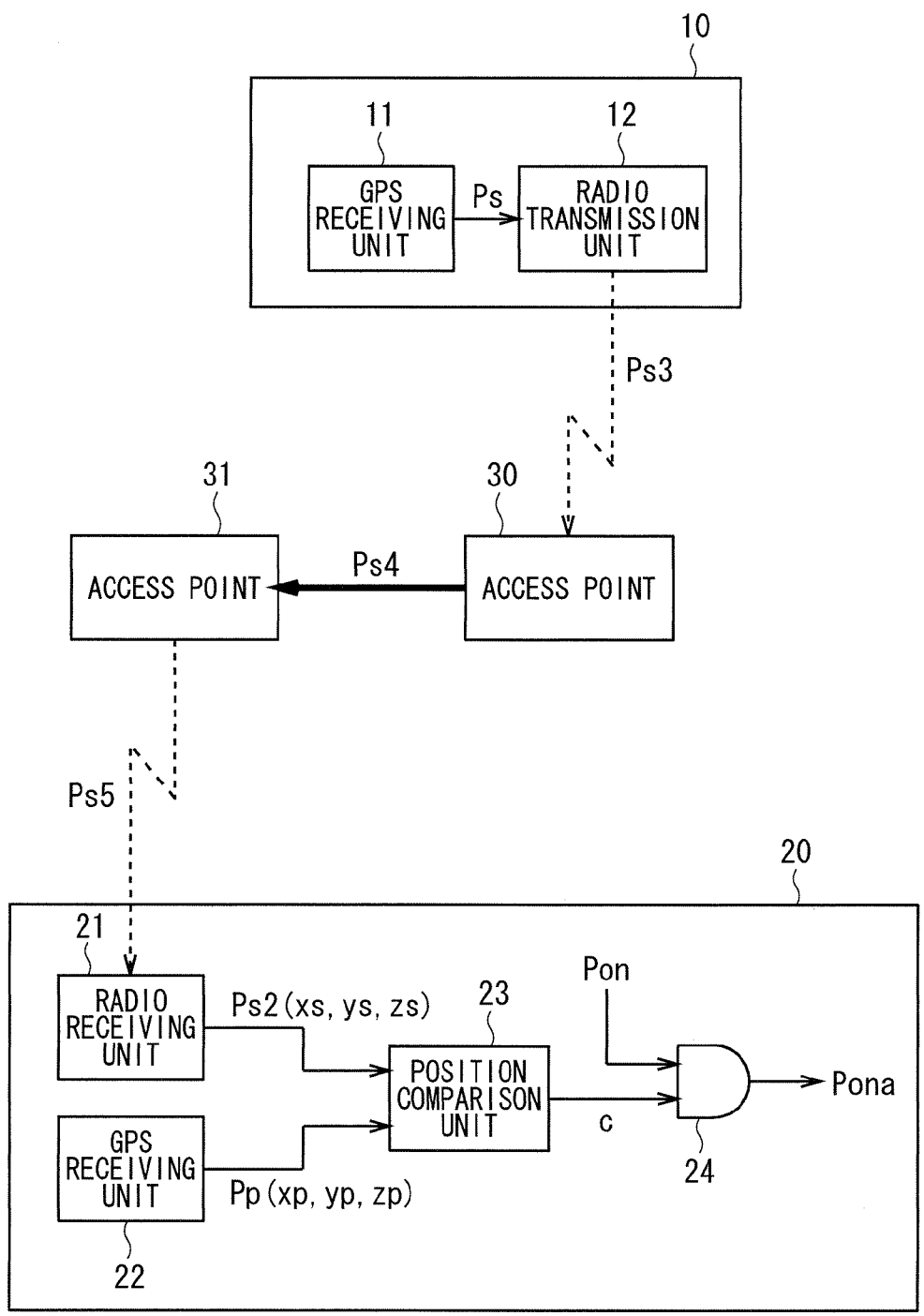
FIG. 6 is a block diagram showing a main configuration of an unauthorized use preventing system of a projection-type projector of a fifth preferred embodiment according to the present invention.

FIG. 6 is a block diagram showing a main configuration of an unauthorized use preventing system of a projection-type projector of a fifth preferred embodiment according to the present invention, and shows configurations of the security section 20 of the projection-type projector 100 and the security key 10, and access points 30 and 31. Note that the security section 20 is a region related to the security, which is included in the device control unit 1 shown in FIG. 1.

The GPS receiving unit 11 of the security key 10, which is shown in FIG. 6, gives the global position Ps of the security key 10 to the radio transmission unit 12, and the radio transmission unit 12 converts the position information Ps into a signal handleable in a wireless LAN (Local Area Network), which is a radio signal Ps3, and transmits the radio signal Ps3 to the access point 30 installed in the vicinity of the security key 10.

At the access point 30, the radio signal Ps3 is converted into a signal Ps4 handleable in a wide area communication network such as the Internet, and through such a public communication network (not shown), is sent to the access point 31 installed in the vicinity of the projection-type projector 100.

At the access point 31, the signal Ps4 is converted into a signal handleable in the wireless LAN, and is transmitted as a radio signal Ps5 to the projection-type projector 100. Then, the radio receiving unit 21 of the security section 20 demodulates the received radio signal Ps5 into the position information Ps2, and outputs the demodulated position information Ps2 to the position comparison unit 23. Here, the position information Ps2 becomes a signal indicating the same position as that of the position information Ps. Operations on and after this output are the same as those of the first preferred embodiment.

In accordance with the projection-type projector of the fifth preferred embodiment described above, the security key 10 and the projection-type projector 100 indirectly communicates with each other through the wide area communication network. Accordingly, it is not necessary to arrange the security key 10 in the vicinity of the projection-type projector 100 or for the user to hold the security key 10 as in the case where both thereof directly communicate with each other. If the projection-type projector is located within a range of being radio-communicable with the access point 31, then it becomes possible to extend the use-permitted range (distance a) to a wider range. For example, it becomes possible to allow the projection-type projector to be installed in a conference room on a different floor in the same building and to be installed in a conference room in a different building.

Modification Example

In the fifth preferred embodiment described above, it is described that the communication between the radio transmission unit 12 and the access point 30 and the communication between the access point 31 and the radio receiving unit 21 are performed by using the communication protocol of the wireless LAN; however, the communication protocol may be other communication protocol that enables the radio communication.

Moreover, the description is made of the example of using the Internet for the communication between the access point 30 and the access point 31; however, other wide area communication networks such as a private line and a cellular phone line may be used.

Sixth Preferred Embodiment

Figure 7:
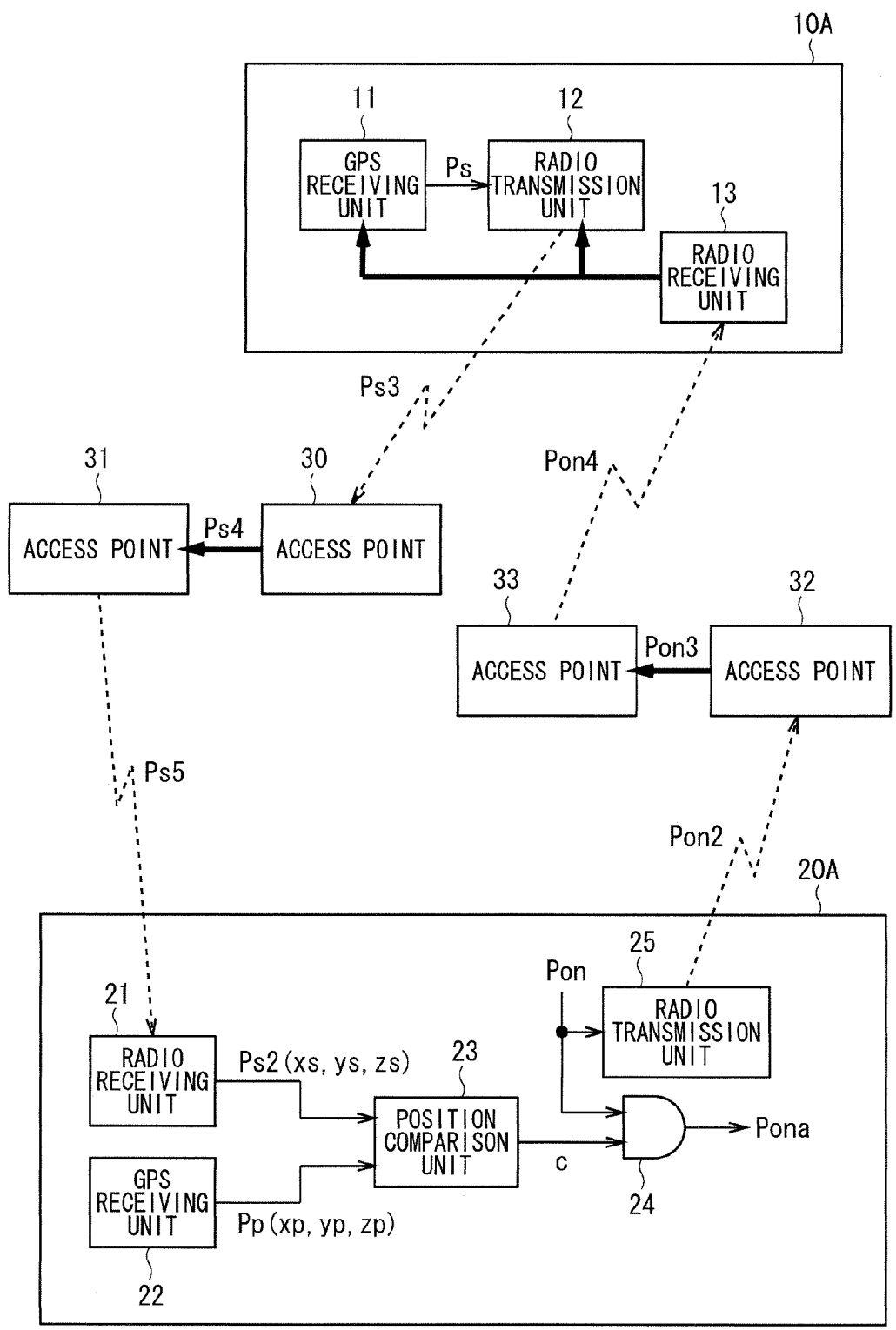
FIG. 7 is a block diagram showing a main configuration of an unauthorized use preventing system of a projection-type projector of a sixth preferred embodiment according to the present invention.

FIG. 7 is a block diagram showing a main configuration of an unauthorized use preventing system of a projection-type projector of a sixth preferred embodiment according to the present invention, and shows configurations of the security section 20A of the projection-type projector 100 and the security key 10A, and access points 30, 31, 32 and 33. Note that the security section 20A is a region related to the security, which is included in the device control unit 1 shown in FIG. 1.

As shown in FIG. 7, the security key 10A has basically the same configuration as that of the security key 10A of the second preferred embodiment, which is shown in FIG. 3; however, the radio transmission unit 12 and the radio receiving unit 13 are configured to communicate with the access points 30 and 33 by the wireless LAN, respectively. Moreover, the security section 20A has basically the same configuration as that of the security section 20A of the second preferred embodiment, which is shown in FIG. 3; however, the radio transmission unit 25 and the radio receiving unit 21 are configured to communicate with the access points 32 and 31 by the wireless LAN, respectively.

In the above-described configuration, the signal Pon (1 at the time when the power supply is ON, and 0 otherwise) coming from the power supply ON button of the projection-type projector 100 or the remote control is given to the AND gate 24, and in addition, also to the radio transmission unit 25.

The radio transmission unit 25 converts the signal Pon into a signal handleable in the wireless LAN, which is a radio signal Pon2, and transmits the radio signal Pon2 to the access point 32 installed in the vicinity of the projection-type projector 100. At the access point 32, the radio signal Pon2 is converted into a signal Pon3 handleable in the wide area communication network such as the Internet, and through the public communication network (not shown), is sent to the access point 33 installed in the vicinity of the security key 10A.

At the access point 33, the signal Pon3 is converted into a signal handleable in the wireless LAN, and is transmitted as a radio signal Pon4 to the security key 10A. The radio receiving unit 13 demodulates the received radio signal Pon4 into the signal Pon. Then, the radio receiving unit 13 operates the GPS receiving unit 11 and the radio transmission unit 12 for the fixed period t only in the case where the signal Pon is 1.

The GPS receiving unit 11 of the security key 10A shown in FIG. 7 gives the global position information Ps of the security key 10A to the radio transmission unit 12, and the radio transmission unit 12 converts the position information Ps into a signal handleable in the wireless LAN, which is the radio signal Ps3, and transmits the radio signal Ps3 to the access point 30 installed in the vicinity of the security key 10A.

At the access point 30, the radio signal Ps3 is converted into the signal Ps4 handleable in the wide area communication network such as the Internet, and through the public communication network concerned (not shown), is sent to the access point 31 installed in the vicinity of the projection-type projector 100.

At the access point 31, the signal Ps4 is converted into a signal handleable in the wireless LAN, and is transmitted as the radio signal Ps5 to the projection-type projector 100. Then, the radio receiving unit 21 of the security section 20A demodulates the received radio signal Ps5 into the position information Ps2, and outputs the demodulated position information Ps2 to the position comparison unit 23. Here, the position information Ps2 becomes a signal indicating the same position as that of the position information Ps. Operations on and after this output are the same as those of the second preferred embodiment.

In accordance with the projection-type projector of the sixth preferred embodiment described above, the security key 10A and the projection-type projector 100 indirectly communicates with each other through the wide area communication network. Accordingly, it is not necessary to arrange the security key 10A in the vicinity of the projection-type projector 100 or for the user to hold the security key 10A as in the case where both thereof directly communicate with each other. If the projection-type projector is located within the range of being radio-communicable with the access point 31, then it becomes possible to extend the use-permitted range (distance a) to a wider range. For example, it becomes possible to allow the projection-type projector to be installed in a conference room on a different floor in the same building and to be installed in a conference room in a different building.

Modification Example

In the sixth preferred embodiment described above, it is described that the communication between the radio transmission unit 12 and the access point 30, the communication between the access point 31 and the radio receiving unit 21, the communication between the radio transmission unit 25 and the access point 32 and the communication between the access point 33 and the radio receiving unit 13 are performed by using the communication protocol of the wireless LAN; however, the communication protocol may be other communication protocol that enables the radio communication.

Moreover, it is described that the Internet is used for the communication between the access point 30 and the access point 31 and the communication between the access point 32 and the access point 33; however, other wide area communication networks such as the private line and the cellular phone line may be used.

Seventh Preferred Embodiment

Figure 8:
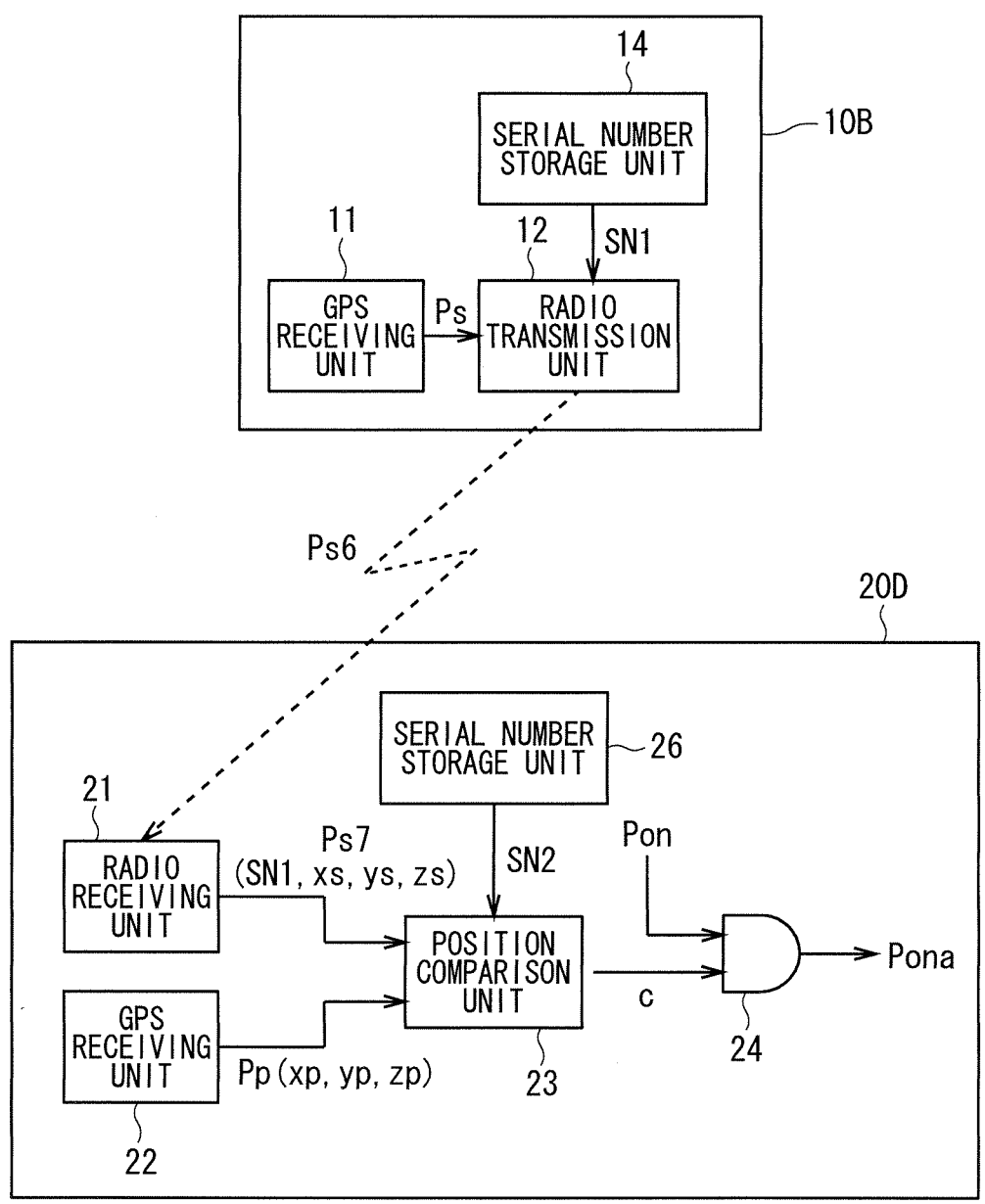
FIG. 8 is a block diagram showing a main configuration of an unauthorized use preventing system of a projection-type projector of a seventh preferred embodiment according to the present invention.

FIG. 8 is a block diagram showing a main configuration of an unauthorized use preventing system of a projection-type projector of a seventh preferred embodiment according to the present invention, and shows configurations of a security section 20D of the projection-type projector 100 and a security key 10B (unauthorized use preventing device). Note that the security section 20D is a region related to the security, which is included in the device control unit 1 shown in FIG. 1.

As shown in FIG. 8, the security key 10B is configured to further include a serial number storage unit 14 (first identification symbol storage unit), which is connected to the radio transmission unit 12, with respect to the security key 10 of the first preferred embodiment, which is shown in FIG. 2. The security section 20D is configured to further include a serial number storage unit 26 (second identification symbol storage unit), which is connected to the position comparison unit 23, with respect to the security section 20 of the first preferred embodiment, which is shown in FIG. 2.

In the above-described configuration, the radio transmission unit 12 reads out a serial number SN1, which is intrinsic to each security key, from the serial number storage unit 14 that stores the serial number SN1, and adds the serial number SN1 before the global position information Ps of the security key 10B, which is obtained from the GPS receiving unit 11, and thereafter, transmits the position information Ps, which is added with the serial number SN1, as a radio signal Ps6.

The radio receiving unit 21 of the security section 20D receives the radio signal Ps6, demodulates the radio signal Ps6 into a signal Ps7 containing the serial number SN1 and the position information Ps, and outputs the signal Ps7 to the position comparison unit 23.

Here, a serial number SN2 stored in the serial number storage unit 26 in the security section 20D is the same as the serial number SN1 stored in the serial number storage unit 14 in the security key 10B.

The position comparison unit 23 first compares the serial number SN1 and the serial number SN2, which is read out from the serial number storage unit 26, with each other, and only in the case where both thereof are the same, compares an inter-instrument distance d between the security key 10B and the projection-type projector 100 and the threshold distance a with each other, and determines whether or not the projection-type projector 100 is located in the vicinity of the security key 10B.

Note that, if the serial numbers SN1 and SN2 are not the same, then such a determination as to whether or not the projection-type projector 100 is located in the vicinity of the security key 10B is not implemented, and the light source of the projection-type projector 100 is not lighted.

In accordance with the projection-type projector of the seventh preferred embodiment described above, one security key is associated with one projection-type projector, and accordingly, even in the case of using pluralities of the projection-type projectors and the security keys, malfunctions thereof are avoided, and it becomes possible to prevent the unauthorized use.

Modification Example

In the seventh preferred embodiment described above, there is illustrated an example of using the serial number as the number intrinsic to each security key; however, an identification number other than the serial number may be used as long as the identification number concerned is an intrinsic identification number capable of identifying each security key.

Moreover, an example is illustrated, in which the serial number SN1 is added before the global position information Ps of the security key 10B; however, the serial number SN1 may be added after the position information Ps, or may be inserted into a specific position of the position information Ps. Moreover, there may be adopted a configuration in which the position information Ps is encrypted by taking the serial number SN1 as a key.

Eighth Preferred Embodiment

Figure 9:
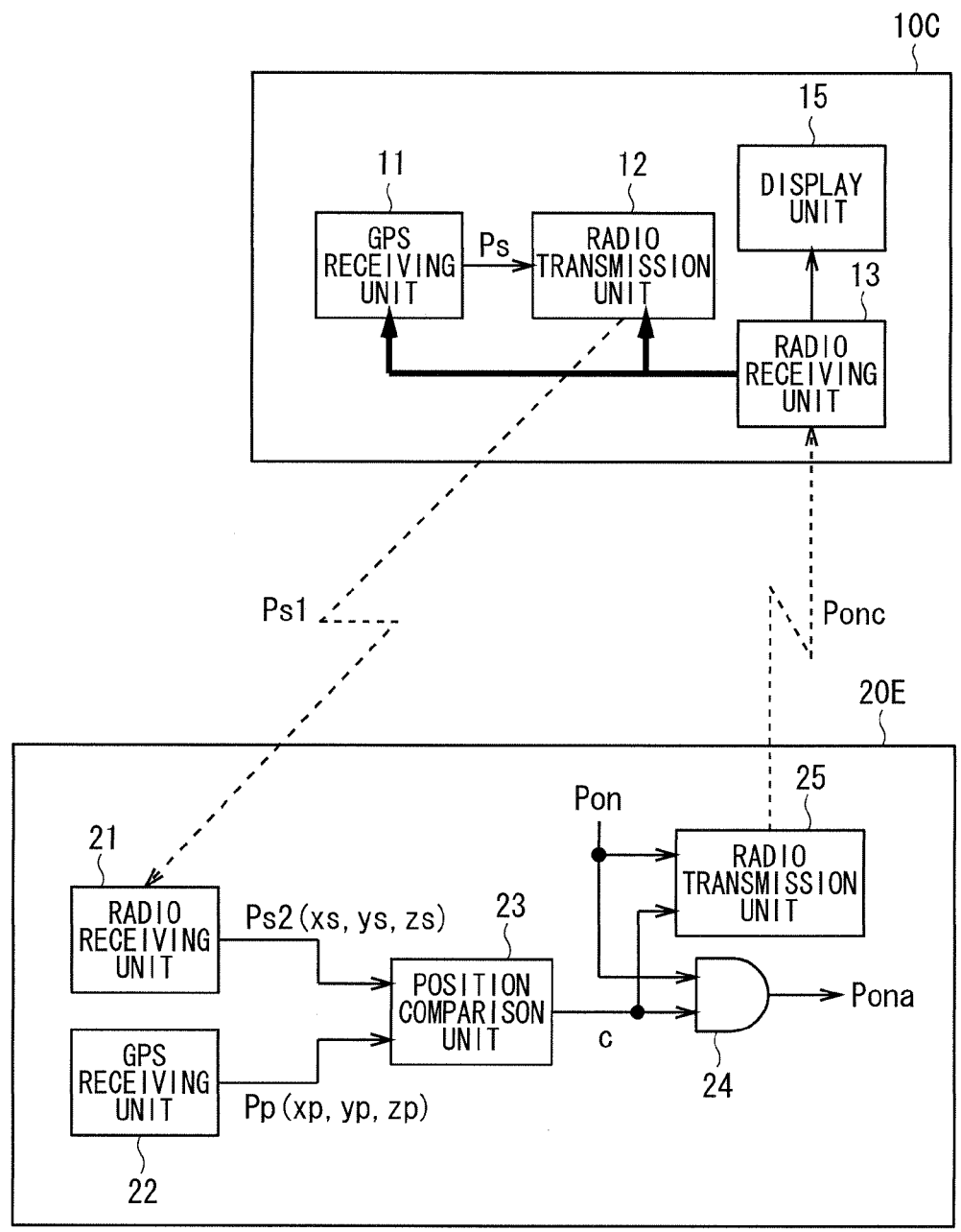
FIG. 9 is a block diagram showing a main configuration of an unauthorized use preventing system of a projection-type projector of an eighth preferred embodiment according to the present invention.

FIG. 9 is a block diagram showing a main configuration of an unauthorized use preventing system of a projection-type projector of an eighth preferred embodiment according to the present invention, and shows configurations of a security section 20E of the projection-type projector 100 and a security key 10C (unauthorized use preventing device). Note that the security section 20E is a region related to the security, which is included in the device control unit 1 shown in FIG. 1.

As shown in FIG. 9, the security key 10C is configured to further include a display unit 15, which is connected to the radio receiving unit 13, with respect to the security key 10A of the second preferred embodiment, which is shown in FIG. 3. The security section 20E is configured so that the position comparison result signal c can also be inputted to the radio transmission unit 25 with respect to the security section 20A of the second preferred embodiment, which is shown in FIG. 3.

The position comparison unit 23 determines whether or not the projection-type projector 100 is located in the vicinity of the security key 10C, sets the position comparison result signal c at 1 in the case where the projection-type projector 100 is located in the vicinity of the security key 10C, and sets the position comparison result signal c at 0 in the case where the projection-type projector 100 is not located in the vicinity of the security key 10C.

The position comparison result signal c is inputted to the AND gate 24, and in addition, is also inputted to the radio transmission unit 25. The radio transmission unit 25 adds the signal Pon, which comes from the power supply ON button of the projection-type projector 100 or the remote control, to the position comparison result signal c, thereby creates a radio signal Ponc, modulates the radio signal Ponc, and transmits the modulated radio signal Ponc to the outside of the projection-type projector 100.

The radio receiving unit 13 of the security key 10C has functions to demodulate the received radio signal Ponc, and to determine whether or not the position comparison result signal c is 0. In the case where the position comparison result signal c is 0, the radio receiving unit 13 regards that the projection-type projector 100 is not located in the vicinity of the security key 10C, and displays such a warning, for example, as "it is possible that the projection-type projector may be unauthorizedly used" on the display unit 15 provided in the security key 10C. Note that, in actual, the radio receiving unit 13 does not control the display unit 15, but in the case where it is determined that the position comparison result signal c is 0, a determination result is given as a signal to a control device (not shown, and for example, included in the display unit 15) that controls the display unit 15, whereby the control device concerned controls the display unit 15.

Moreover, in the case where the position comparison result signal c is 0, the radio receiving unit 13 does not operate the GPS receiving unit 11 and the radio transmission unit 12. In the case where the position comparison result signal c is 1, and the signal Pon coming from power supply ON button of the projection-type projector 100 or the remote control is 1, the radio receiving unit 13 operates the GPS receiving unit 11 and the radio transmission unit 12 for the fixed period t. Operations on and after this operation are the same as those of the second preferred embodiment.

In accordance with the projection-type projector of the eighth preferred embodiment described above, in the case where the projection-type projector 100 is not located in the vicinity of the security key 10C, it is determined that it is possible that the projection-type projector 100 may be unauthorizedly used, and the warning is displayed on the display unit 15 provided with the security key 10C. Accordingly, it becomes possible to notify an authorized user that it is possible that the projection-type projector 100 may be unauthorizedly used.

Modification Example

In the eighth preferred embodiment described above, there is illustrated a configuration in which the display unit 15 connected to the radio receiving unit 13 is provided with respect to the security key 10A of the second preferred embodiment. However, similar effects are obtained even if a similar configuration is adopted also for the security key 10A of the sixth preferred embodiment, and there is adopted such a configuration in which the position comparison result signal c is also inputted to the radio transmission unit 25 with respect to the security section 20A of the sixth preferred embodiment. It is needless to say that, in this case, functions of the radio receiving unit 13, the position comparison unit 23 and the radio transmission unit 25 are also similar to the functions of the radio receiving unit 13, the position comparison unit 23 and the radio transmission unit 25 in the eighth preferred embodiment described above.

Ninth Preferred Embodiment

In the first preferred embodiment to the eighth preferred embodiment, which are described above, the descriptions have been made on the assumption that the security keys 10 to 10C are devices separate and independent of the projection-type projector 100; however, there may be adopted a configuration in which the functions of such a security key are built in the remote control (remote operation device) attached to the projection-type projector 100.

In accordance with the projection-type projector of the ninth preferred embodiment described above, the remote control is stored as appropriate, whereby it becomes possible to prevent the unauthorized use of the projection-type projector 100.

Moreover, in the case where the security key and the remote control are devices separate and independent of each other, then there is an advantage that the security key can be stored in a different place from that for the projection-type projector 100 and the remote control, and on the other hand, it is possible that the fact that the security key is being used may be forgotten.

Therefore, for example, in the case where the battery that drives the security key runs down, it is possible that a mistake may be made so that the projection-type projector 100 can be broken; however, the functions of the security key are built in the remote control, whereby it also becomes possible prevent such a mistake as described above.

Moreover, in the first preferred embodiment to the ninth preferred embodiment, which are described above, the descriptions have been made on the assumption that each of the security sections 20 to 20E is included in the device control unit 1 shown in FIG. 1; however, there may be adopted a configuration, in which the security section is provided separately from the device control unit 1, the logical product output Pona is given to the device control unit 1, and the device control unit 1 controls the light source drive unit 2 by using the logical product output Pona.

Note that, in the present invention, within the scope thereof, it is possible to freely combine the respective preferred embodiments with one another, and to appropriately modify and omit the respective preferred embodiments.

While the invention has been shown and described in detail, the foregoing description is in all aspects illustrative and not restrictive. It is therefore understood that numerous modifications and variations can be devised without departing from the scope of the invention.

What is claimed is:

1. An unauthorized use preventing system of a projection-type projector, the system comprising:
    an unauthorized use preventing device which is separate and remote from said projection-type projector; and
    a security section provided in said projection-type projector,
    wherein said unauthorized use preventing device includes:
        a first GPS receiver that measures a global position thereof and outputs the global position as first position information; and
        a first radio transmitter that wirelessly transmits said first position information to an outside,
    said security section includes:
        a second GPS receiver that measures a global position thereof and outputs the global position as second position information;
        a first radio receiver that receives said first position information;
        a processor configured to perform a process including:
            a position comparison operation that receives said first position information and said second position information, determines whether an inter-instrument distance calculated based on both pieces of said information is less than a threshold distance or equal to or more than said threshold distance, and outputs a result of the determination as a position comparison result signal; and
            a logical product calculation operation that receives said position comparison result signal and a power supply turning-on signal indicating whether or not a power supply of said projection-type projector is turned on, and calculates and outputs a logical product of both of said signals, and
    an output signal of said logical product calculation operation is decisive of whether or not to light a light source of said projection-type projector, so that unauthorized use of said projection-type projector is prevented.

2. The unauthorized use preventing system of a projection-type projector according to claim 1, wherein
    said security section further includes a second radio transmitter that wirelessly transmits power supply turning-on information to the outside, the power supply turning-on information indicating information of said power supply turning-on signal,
    said unauthorized use preventing device further includes a second radio receiver that receives said power supply turning-on information, and
    said second radio receiver controls said first GPS receiver and said first radio transmitter to operate for a fixed period in a case where said power supply turning-on information is information indicating that the power supply of said projection-type projector is turned on.

3. The unauthorized use preventing system of a projection-type projector according to claim 2, wherein
    after the power supply of said projection-type projector is turned on, said second radio receiver controls said first GPS receiver and said first radio transmitter to operate periodically for every fixed period.

4. The unauthorized use preventing system of a projection-type projector according to claim 1, wherein
    in said position comparison operation, said threshold distance can be changeable based on a change instruction coming from the outside.

5. The unauthorized use preventing system of a projection-type projector according to claim 4, wherein
    said position comparison operation receives feedback of said output signal of said logical product calculation operation, and allows said threshold distance to be changeable only in a case where said output signal of said logical product calculation operation is a signal for lighting said light source of said projection-type projector.

6. The unauthorized use preventing system of a projection-type projector according to claim 1, further comprising:
    a first radio base station that receives said first position information transmitted from said first radio transmitter and gives said first position information to a wide area communication network; and
    a second radio base station that receives said first position information from said wide area communication network and transmits said first information to said first radio receiver.

7. The unauthorized use preventing system of a projection-type projector according to claim 2, wherein
    said second radio transmitter wirelessly transmits said position comparison result signal together with said power supply turning-on information to the outside,
    said unauthorized use preventing device further includes a display unit connected to said second radio receiver, and
    in a case where said position comparison result signal indicates that said inter-instrument distance is equal to or more than said threshold distance, said second radio receiver causes a warning to be displayed on said display unit.

8. The unauthorized use preventing system of a projection-type projector according to claim 2, further comprising:
    a first radio base station that receives said first position information transmitted from said first radio transmitter and gives said first position information to a wide area communication network;
    a second radio base station that receives said first position information from said wide area communication network and transmits said first information to said first radio receiver;
    a third radio base station that receives said power supply turning-on information transmitted from said second radio transmitter and gives said power supply turning-on information to said wide area communication network; and
    a fourth radio base station that receives said power supply turning-on information from said wide area communication network and transmits said power supply turning-on information to said second radio receiver.

9. The unauthorized use preventing system of a projection-type projector according to claim 1, wherein
said unauthorized use preventing device further includes a first identification symbol storage device that stores a first identification symbol, the first identification symbol storage device being connected to said first radio transmitter,
said security section further includes a second identification symbol storage device that stores a second identification symbol, the second identification symbol storage device being connected to said processor,
said first radio transmitter adds said first identification symbol to said first position information and transmits said first position information added with said first identification symbol,
said position comparison operation compares said first identification symbol received by said first radio receiver and said second identification symbol read out from said second identification symbol storage unit with each other, and only in a case where both of said first and second identification symbols are the same, compares said inter-instrument distance and said threshold distance with each other.

10. The unauthorized use preventing system of a projection-type projector according to claim 8, wherein
said second radio transmitter wirelessly transmits said position comparison result signal together with said power supply turning-on information to the outside,
said unauthorized use preventing device further includes a display unit connected to said second receiving unit, and
in a case where said position comparison result signal indicates that said inter-instrument distance is equal to or more than said threshold distance, said second radio receiver causes a warning to be displayed on said display unit.

11. The unauthorized use preventing system of a projection-type projector according to claim 1, wherein
said unauthorized use preventing device is built in a remote operation device that remotely operates said projection-type projector.

* * * * *